(12) United States Patent
Lee et al.

(10) Patent No.: US 11,974,196 B2
(45) Date of Patent: Apr. 30, 2024

(54) SYSTEMS AND METHODS FOR MULTICAST SERVICES IN AN EDGE COMPUTING FRAMEWORK

(71) Applicant: Verizon Patent and Licensing Inc., Basking Ridge, NJ (US)

(72) Inventors: Jay J. Lee, San Ramon, CA (US); Ambreen Habib, Golden, CO (US); Julian Richards, Dallas, TX (US); Taher Farkhondeh, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 153 days.

(21) Appl. No.: 17/553,565

(22) Filed: Dec. 16, 2021

(65) Prior Publication Data

US 2023/0199440 A1 Jun. 22, 2023

(51) Int. Cl.
*H04W 4/08* (2009.01)
*H04W 48/02* (2009.01)
*H04W 72/12* (2023.01)
*H04W 72/542* (2023.01)
*H04W 88/12* (2009.01)

(52) U.S. Cl.
CPC ............. *H04W 4/08* (2013.01); *H04W 48/02* (2013.01); *H04W 72/542* (2023.01); *H04W 88/12* (2013.01)

(58) Field of Classification Search
CPC ..... H04W 4/08; H04W 48/02; H04W 72/542; H04W 88/12

USPC .................................. 455/518; 370/312, 328
See application file for complete search history.

(56) References Cited

U.S. PATENT DOCUMENTS

| | | | |
|---|---|---|---|
| 2014/0185513 A1* | 7/2014 | Ahmadi | H04W 4/08 370/312 |
| 2016/0044469 A1* | 2/2016 | Inomata | H04W 4/08 370/328 |
| 2016/0242011 A1* | 8/2016 | Ericson | H04L 67/1044 |
| 2017/0373789 A1* | 12/2017 | Huang | H04L 1/0003 |
| 2018/0332444 A1* | 11/2018 | Natarajan | H04W 24/08 |
| 2020/0008044 A1* | 1/2020 | Poornachandran | H04W 24/08 |
| 2020/0100070 A1* | 3/2020 | Cheng | H04W 4/08 |
| 2022/0225065 A1* | 7/2022 | Doken | H04L 41/5009 |
| 2022/0417823 A1* | 12/2022 | Jia | H04W 24/08 |

* cited by examiner

*Primary Examiner* — Tan H Trinh

(57) ABSTRACT

A Multi-Access Edge Computing (MEC) device, associated with a base station, may include a processor configured to receive a request to send data to a plurality of user equipment (UE) devices. The MEC device may be further configured to determine that the data is to be delivered to the plurality of UE devices by the base station via multicast; determine signal quality values for the plurality of UE devices; select a subset of the plurality of UE devices based on the determined signal quality values; and send, using the base station, the data to the selected subset of the plurality of UE devices via multicast, and delaying or terminating delivery of the requested data to UE devices, of the plurality of UE devices, that are not in the selected subset.

20 Claims, 7 Drawing Sheets

SYSTEMS AND METHODS FOR MULTICAST SERVICES IN AN EDGE COMPUTING FRAMEWORK

BACKGROUND INFORMATION

To satisfy the needs and demands of users of mobile communication devices, providers of wireless communication services continue to improve and expand available services and networks used to deliver such services. One aspect of such improvements includes the development of wireless access networks and options to utilize such wireless access networks. A wireless access network may manage a large number of devices. Delivering data to a large number of different services under different conditions poses various challenges.

DETAILED DESCRIPTION OF EMBODIMENTS

Figure 1:
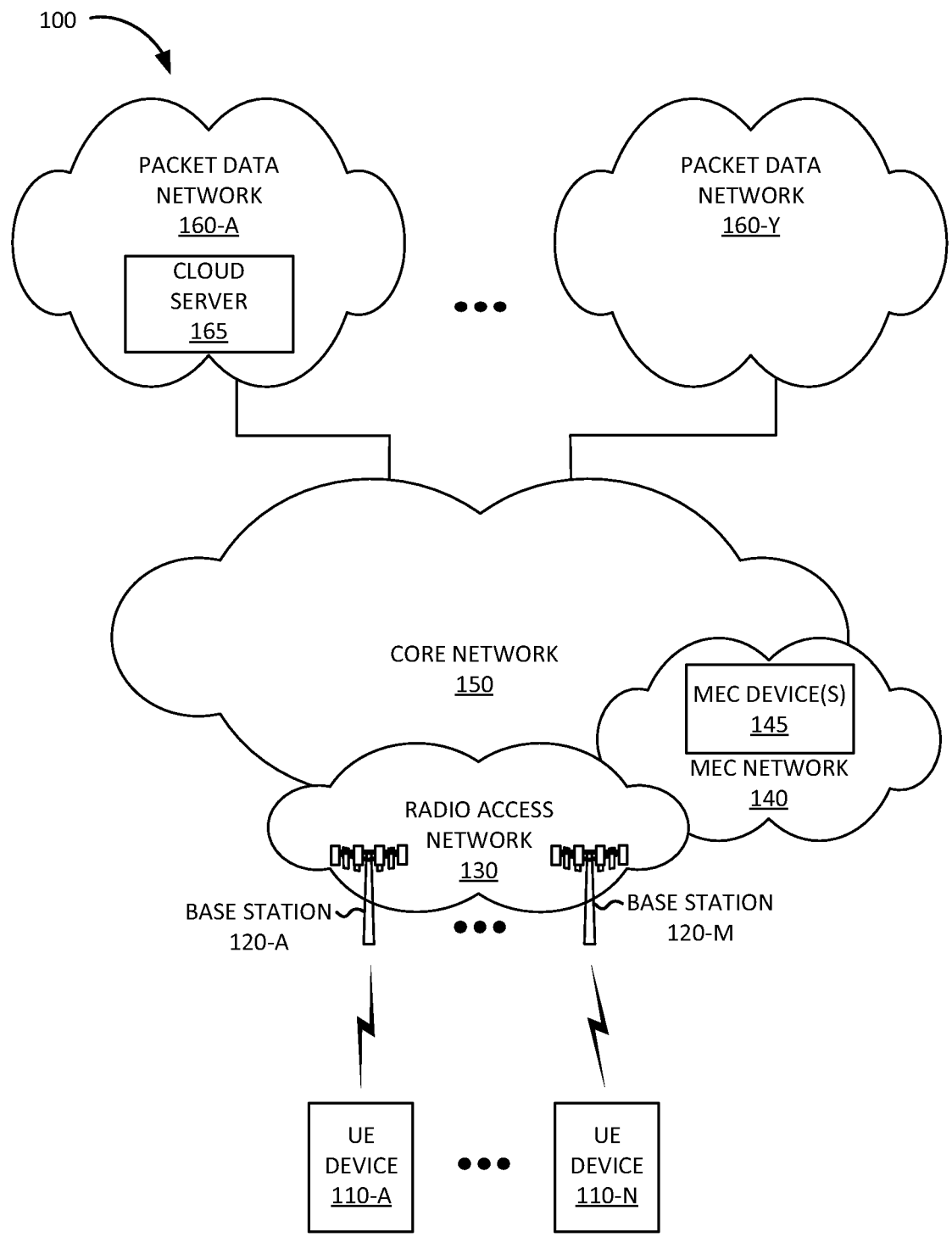
FIG. 1 illustrates an environment according to an implementation described herein.

The following detailed description refers to the accompanying drawings. The same reference numbers in different drawings identify the same or similar elements.

Next generation mobile wireless networks, such as $5^{th}$ generation (5G) mobile wireless networks, provide various improvement over previous generations of mobile wireless networks. For example, 5G networks utilize high frequency bands (e.g., 24 Gigahertz, 39 GHz, etc.), and/or lower frequency bands such as Sub 6 GHz, and a large number of antennas. A 5G New Radio (NR) radio access network (RAN) provides significant improvements in bandwidth and/or latency over previous generations of wireless network technology. As another example, a 5G core network may provide support for different types of communications services, such as enhanced Mobile Broadband (eMBB), ultra-reliable low latency communication (URLLC), massive Machine Type Communication (mMTC), and/or other types of communications.

An important enhancement to wireless communication services to reduce latency in 5G networks is the use of edge computing via a Multi-Access Edge Computing (MEC) architecture. The MEC architecture includes devices and associated connections located at the network edge relative to the point of attachment of a wireless user equipment (UE) device to a wireless communication network via a base station. Thus, the MEC network may be located in geographic proximity to the base station and/or be close to the base station from a network topology perspective. The devices in a MEC network may implement services previously implemented in a core network and/or a cloud computing center and enable processing to be offloaded from the core network and/or cloud computing center at a reduced latency.

Furthermore, a mobile wireless network may need to integrate unicast, multicast, and broadcast technologies in order to efficiently manage radio resources and/or to grant groups of users simultaneous access to the same content. A unicast message may be sent to a single UE device point-to-point, a multicast message may be sent to multiple UE devices in a multicast group, and a broadcast message may be sent to all UE devices attached to a base station. The demand for multicast services continues to increase with applications and services such as video streaming, video downloading, video conferencing, real-time video broadcasting, vehicle-to-everything (V2X) messaging, public safety and/or mission critical services, real-time gaming, massive Internet of Things (IoT) applications, industrial IoT applications, and/or other types of applications that require delivery of data to multiple UE devices simultaneously. In 5G, multicast services may be referred to as Multicast-Broadcast Services (MBS).

In next generation networks, such as 5G networks, integration of multicasting and broadcasting into MEC services, as well as seamless switching between unicasting, multicasting, and broadcasting for MEC services, may be critical for maintaining service requirements and satisfactory user experience.

Implementations described herein relate to systems and methods for unicast, multicast, and broadcast services in an edge computing network. A MEC device associated with a base station may receive a request to send data to multiple UE devices. As an example, requests to send data to multiple UE devices may be received from the UE devices, such as requests to stream video or audio content, download or update an application, etc. As another example, the request to send data to the multiple UE devices may be a request from a server device, or an application or service running on the MEC device, to push a notification and/or update to the multiple UE devices.

In response to receiving the request to send data to the multiple UE devices, the MEC device may determine that the data is to be delivered to a set of UE devices by the base station via multicast and may further determine whether the data is available locally in a storage location associated with the MEC device, and may obtain the data from a cloud server via a core network associated with the base station, when the data is not available locally. The MEC device may then compute an execution time to deliver the data to the set of UE devices and determine whether the computed execution time is greater than an execution time threshold. The execution time may be computed based on a ratio of the size of the data and a throughput associated with the base station. If the data is not available locally, the execution time may additionally include the time to obtain the data from the cloud server. The throughput associated with the base station may be computed based on a radio channel capacity associated with the base station and a number of UE devices serviced by the base station, and the radio channel capacity may be computed based on a bandwidth associated with the base station and a signal to noise ratio associated with the base station.

The MEC device may determine an execution time threshold based on service requirements associated with the data or the UE devices, such as a latency requirement. If the computed execution time is less than an execution time threshold, the base station may send the data to the set of UE devices via multicast. If the computed execution time is greater than the execution time threshold, the MEC device may determine signal quality values for the UE devices in the set of UE devices. The signal quality values may include, for example, Reference Signal Received Power (RSRP) values, Receive Strength Signal Indicator (RSSI) values, Reference Signal Received Quality (RSRQ) values, Signal to Noise Ratio (SNR) values, Signal to Interference Plus Noise Ratio (SINR) values, and/or other types of signal quality values.

The MEC device may select a subset from the set of UE devices based on the determined signal quality values. For example, the MEC device may select UE devices for which the signal quality values are greater than a signal quality threshold. The MEC device may then send the data to the selected subset of UE devices via multicast, and delay or terminate delivery of the requested data to UE devices, of the set of UE devices, that are not in the selected subset.

The MEC device may manage delivery of broadcast content in a similar manner. For broadcast, the MEC device may determine the signal quality values for all UE devices serviced by the base station, rather than just UE devices in a multicast group. Furthermore, the MEC device may also manage delivery of unicast content. For example, the MEC device may receive a request to send data to a UE device via unicast. In response, the MEC device may obtain a signal quality value for the UE device, determine whether the obtained signal quality value is less than a signal quality value threshold, and delay or terminate delivery of the data to the UE device when the signal quality value is less than the signal quality value threshold.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), radio access network (RAN) 130 that includes base stations 120-A to 120-M (referred to herein collectively as "base stations 120" and individually as "base station 120"), MEC network(s) 140 that include MEC device(s) 145, a core network 150, packet data networks (PDNs) 160-A to 160-Y (referred to herein collectively as "PDNs 160" and individually as "PDN 160"), and a cloud server 165.

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

As another example, UE device 110 may include an IoT device that uses machine-to-machine (M2M) communication, such as Machine Type Communication (MTC), and/or another type of M2M communication. For example, UE device 110 may include a sensor device (e.g., a vehicle proximity sensor, a motion detector, a temperature sensor, a light sensor, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, an automated teller machine, a vending machine, a parking meter, etc.), a health monitoring device (e.g., a blood pressure monitoring device, a blood glucose monitoring device, etc.), and/or another type of electronic device.

Base station 120 may include a Fifth Generation (5G) New Radio (NR) base station (e.g., a gNodeB) and/or a Fourth Generation (4G) Long Term Evolution (LTE) base station (e.g., an eNodeB). Each base station 120 may include devices and/or components configured to enable cellular wireless communication with UE devices 110. For example, base station 120 may include a radio frequency (RF) transceiver configured to communicate with UE devices using a 5G NR air interface, a 4G LTE air interface, and/or using another type of cellular air interface. Base station 120 may enable communication with core network 150 to enable core network 150 to authenticate UE device 110 with a subscriber management device (e.g., Home Subscriber Server (HSS) in 4G, Unified Data Management (UDM) in 5G, etc.).

RAN 130 may enable UE devices 110 to connect to core network 150 via base stations 120 using cellular wireless signals. For example, RAN 130 may include one or more central units (CUs) and distributed units (DUs) (not shown in FIG. 1) that enable and manage connections from base stations 120 to core network 150. RAN 130 may include features associated with one or more of the following: an LTE Advanced (LTE-A) network and/or a 5G core network or other advanced network; management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; ultra-wideband (UWB) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Each MEC network 140 may be associated with one or more base stations 120 and may provide MEC services for UE devices 110 attached to the base stations 120. MEC network 140 may be in proximity to the one or more base stations 120 from a geographic and network topology perspective, thus enabling low latency communication with UE devices 110 and/or base stations 120. As an example, MEC network 140 may be located on a same site as one of the one or more base stations 120. As another example, MEC network 140 may be geographically closer to the one or more base stations 120, and reachable via fewer network hops and/or fewer switches, than other base stations 120 and/or packet data networks 160. As yet another example, an MEC network 140 may be reached without having to go through a gateway device, such as a 4G Packet Data Network Gateway (PGW) or a 5G User Plane Function (UPF). MEC network 140 may include one or more MEC devices 145. MEC devices 145 may provide MEC services to UE devices 110, such as, for example, content delivery of streaming audio and/or video, cloud computing services, authentication services, etc. In some implementations, MEC devices 145 may host Virtual Network Functions (VNFs) used to implement core network functions for core network 150. MEC devices 145 may provide unicast, multicast, and/or broadcast services while maintaining service requirements for UE devices 110, as described herein.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and PDN 160. In some implementations, core network 150 may include a 5G core network. A 5G core network may include devices that implement network functions (NFs). The NFs may include an Access and Mobility Function (AMF) that performs registration management, connection management, reachability management, mobility management, and/or lawful intercepts; a Session Management Function (SMF) that performs session management, session modification, session release, IP allocation and management, and selection and control of a User Plane Function (UPF); a UPF that serves as a gateway to packet data network 160, acts as an anchor point, performs packet inspection, routing, and forwarding, performs Class of Service (CoS) handling in the user plane, uplink traffic verification, transport level packet marking, downlink packet buffering, and/or other type of user plane functions; a Policy Control Function (PCF) that supports policies to control network behavior, provides policy rules to control plane functions, accesses subscription information relevant to policy decisions, and performs policy decisions; a Unified Data Management (UDM) function that stores and manages subscription information, handles user identification and authentication, and performs access authorization; and/or another type of NF.

In other implementations, core network 150 may include a 4G LTE core network (e.g., an evolved packet core (EPC) network). An EPC network may include a Mobility Management Entity (MME) for control plane processing, authentication, mobility management, tracking and paging, and activating and deactivating bearers; a Serving Gateway (SGW) that provides an access point to and from UE devices, acts as a local anchor point during handovers, and provides routing and forwarding of user data packets to and from a PGW; a PGW that functions as a gateway to a particular PDN 160; a Policy and Charging Rules Function (PCRF) that implements policy and charging rules functions, such as establishment of Quality of Service (QoS) requirements, setting allowed bandwidth and/or data throughput limits for particular bearers, and/or other policies; a Home Subscriber Server (HSS) that stores subscription information for UE devices; and/or other types of components of a 4G core network.

PDNs 160-A to 160-N may each include a packet data network. A particular PDN 160 may be associated with an Access Point Name (APN) and UE device 110 may request a connection to the particular PDN 160 using the APN. PDN 160 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

PDN 60 (e.g., PDN 160-A) may include cloud server 165. Cloud server 165 may include one or more computer devices, such as server devices, configured to store content/data that may be provided to UE devices 110 and/or requested by MEC device 145 when the MEC device 145 does not have a locally stored copy of the content/data. For example, when MEC device 145 receives a request to provide a particular data item to one or more UE devices 110, MEC device 145 may determine the particular data item is not available in a local storage device associated with MEC device 145 and may request the particular data item from cloud server 165. In response, cloud server 165 may provide the requested data item to MEC device 145. While cloud server 165 is shown as being in PDN 160, in other implementations cloud server 165 may be included in core network 150.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
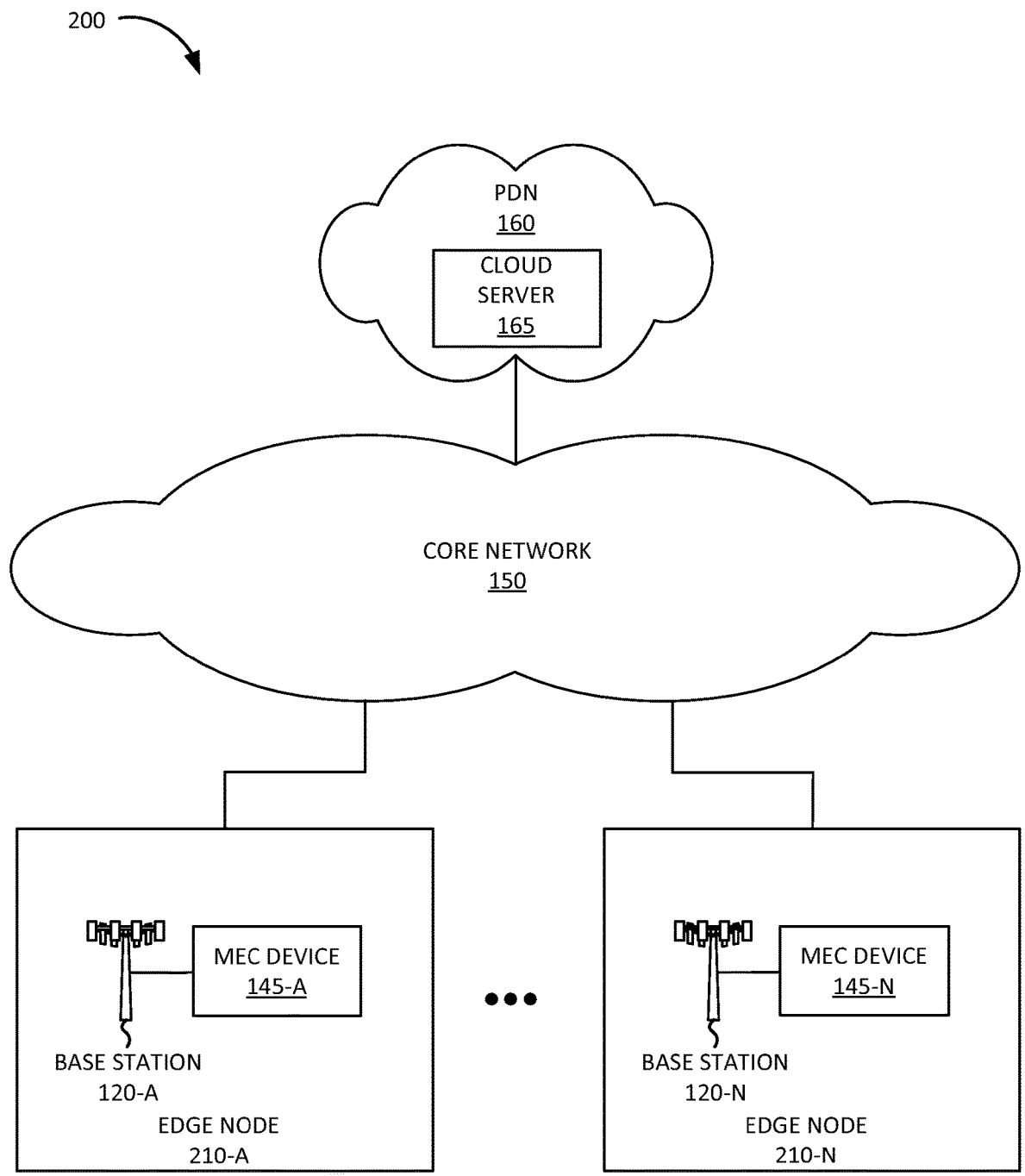
FIG. 2 illustrates an exemplary set of edge nodes according to an implementation described herein.

FIG. 2 illustrates an exemplary system 200 of edge nodes according to an implementation described herein. As shown in FIG. 2, system 200 may include edge nodes 210-A to 210-N, core network 150, and PDN 160. Edge node 210 may include base station 120 and MEC device 145. Thus, base station 120 and MEC device 145 may be co-located. Each edge node 210 may serve a particular geographic area and UE devices 110 within the particular geographic area may attach to base station 120. An application installed on UE device 110 may request content/data from MEC device 145 via base station 120. Alternatively, an application or service running on MEC device 145 and/or cloud server 165 may request to push content/data to UE device 110 as a result of a notification, subscription, software update, etc. If the requested content/data is not available at MEC device 145, MEC device 145 may obtain the content/data from cloud server 165 via core network 150.

Although FIG. 2 shows exemplary components of system 200, in other implementations, system 200 may include fewer components, different components, differently arranged components, or additional components than depicted in FIG. 2. Additionally, or alternatively, one or more components of system 200 may perform functions described as being performed by one or more other components of system 200.

Figure 3:
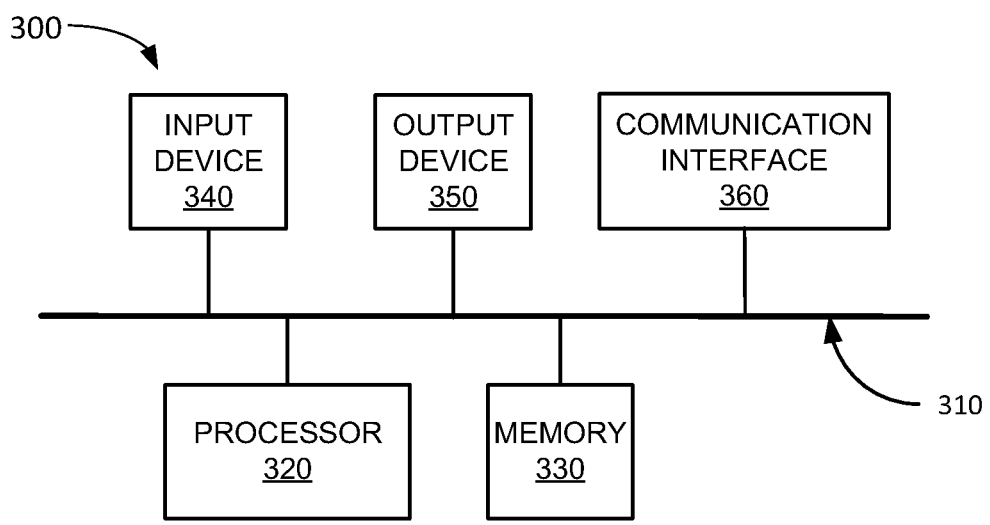
FIG. 3 is a diagram illustrating exemplary components of a device that may be included in a component of an environment according to an implementation described herein.

FIG. 3 is a diagram illustrating example components of a device 300 according to an implementation described herein. UE device 110, base station 120, MEC device 145, cloud server 165, and/or edge node 210 may each include, or be implemented on, one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some implementations, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the user. In some implementations, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to, and/or reception of data from, other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to incorporating unicast, multicast, and/or broadcast services into MEC services while maintaining service requirements associated with UE devices 110. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
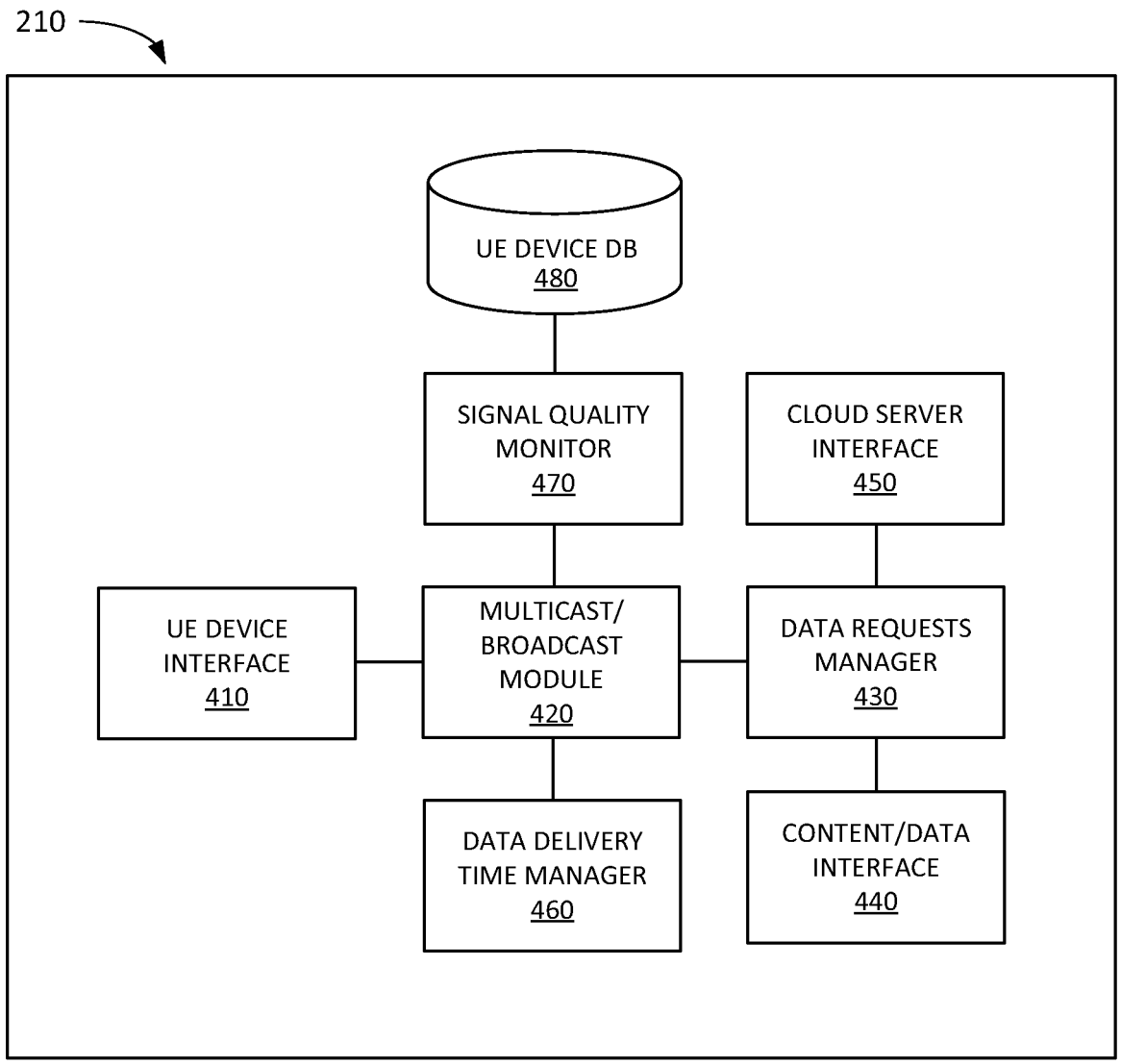
FIG. 4 is a diagram illustrating exemplary components of an edge node according to an implementation described herein.

FIG. 4 is a diagram illustrating exemplary components of edge node 210 according to an implementation described herein. The components of edge node 210 may be implemented, for example, via processor 320 executing instructions from memory 330 in base station 120 and/or MEC device 145. Alternatively, some or all of the components of edge node 210 may be implemented via hard-wired circuitry. As shown in FIG. 4, edge node 210 may include a UE device interface 410, a multicast/broadcast module 420, a data requests manager 430, a content/data interface 440, a cloud server interface 450, a data delivery time manager 460, a signal quality monitor 470, and UE device database (DB) 480.

UE device interface 410 may implement an interface that processes requests to send data to UE devices 110. As an example, UE device interface 410 may receive a request for particular content/data from UE device 110. As another example, UE device interface 410 may receive a request from an application/service running on MEC device 145 and/or cloud server 165 to send particular content/data to one or more UE devices 110 based on a subscription, update, and/or notification setting.

Multicast/broadcast module 420 may manage multicast and broadcast messages to be sent to UE devices 110. For example, multicast/broadcast module 420 may determine whether a content/data item is to be sent to UE devices 110 via multicast or broadcast based on whether the content/data item is labeled for multicast or broadcast distribution, is associated with an application or Class of Service (CoS) designated for multicast or broadcast, is to be sent to multiple UE devices 110 in a same scheduled transmission time period, etc. If the content/data item is to be sent via unicast, multicast/broadcast module 420 may perform a unicast data delivery process as described below with reference to FIG. 5. If the content/data item is to be sent via multicast or broadcast, multicast/broadcast module 420 may perform a multicast or broadcast data delivery process as described below with reference to FIG. 6.

Data requests manager 430 may process requests for content/data to be sent to UE devices 110. For example, data requests manager 430 may determine whether content/data to be sent to UE devices 110 is available locally by using content/data interface 440. Content/data interface 440 may interface with a local storage device that stores content/data associated with MEC device 145, such as applications and/or services running on MEC device 145. If the content/data to be sent to UE devices 110 is not available locally, data requests manager 430 may obtain the content/data from cloud server 165 using cloud server interface 450. Cloud server interface 450 may be configured to communicate with cloud server 165.

Data delivery time manager 460 may determine an execution time to deliver the content/data to UE devices 110. For example, if the content/data is available locally, data delivery time manager 460 may compute the execution time as the time to deliver the content/data to UE devices 110 based on the throughput of base station 120 and the size of the data to be delivered, as explained in more detail below with reference to FIGS. 5 and 6. If the content/data is not available locally, data delivery time manager 460 may compute the execution time as the time to deliver the content/data to UE devices 110 plus the time to obtain the content/data from cloud server 165, as explained in more detail below with reference to FIGS. 5 and 6.

Signal quality monitor 470 may monitor signal quality for UE devices 110 serviced by edge node 210. For example, signal quality monitor 470 may obtain measurement reports from UE devices 110 and store information from the obtained measurement reports in UE device DB 480. UE device DB 480 may store information relating to UE devices 110, including measurement reports received from UE devices 110. A measurement report may include one or more signal quality values reported by UE device 110, such as, for example, an RSSI value, an RSRP value, an RSRQ value, an SNR value, an SINR value, and/or another type of signal quality value. If the computed execution time, as determined by data delivery time manager 460, exceeds an execution time threshold, multicast module 420 may delay or terminate delivery of the content/data to UE devices 110 that are associated with a signal quality that is below a signal quality threshold, as determined by signal quality monitor 470.

Although FIG. 4 shows exemplary components of edge node 210, in other implementations, edge node 210 may include fewer components, different components, additional components, or differently arranged components than depicted in FIG. 4. Additionally, or alternatively, one or more components of edge node 210 may perform one or more tasks described as being performed by one or more other components of edge node 210.

Figure 5:
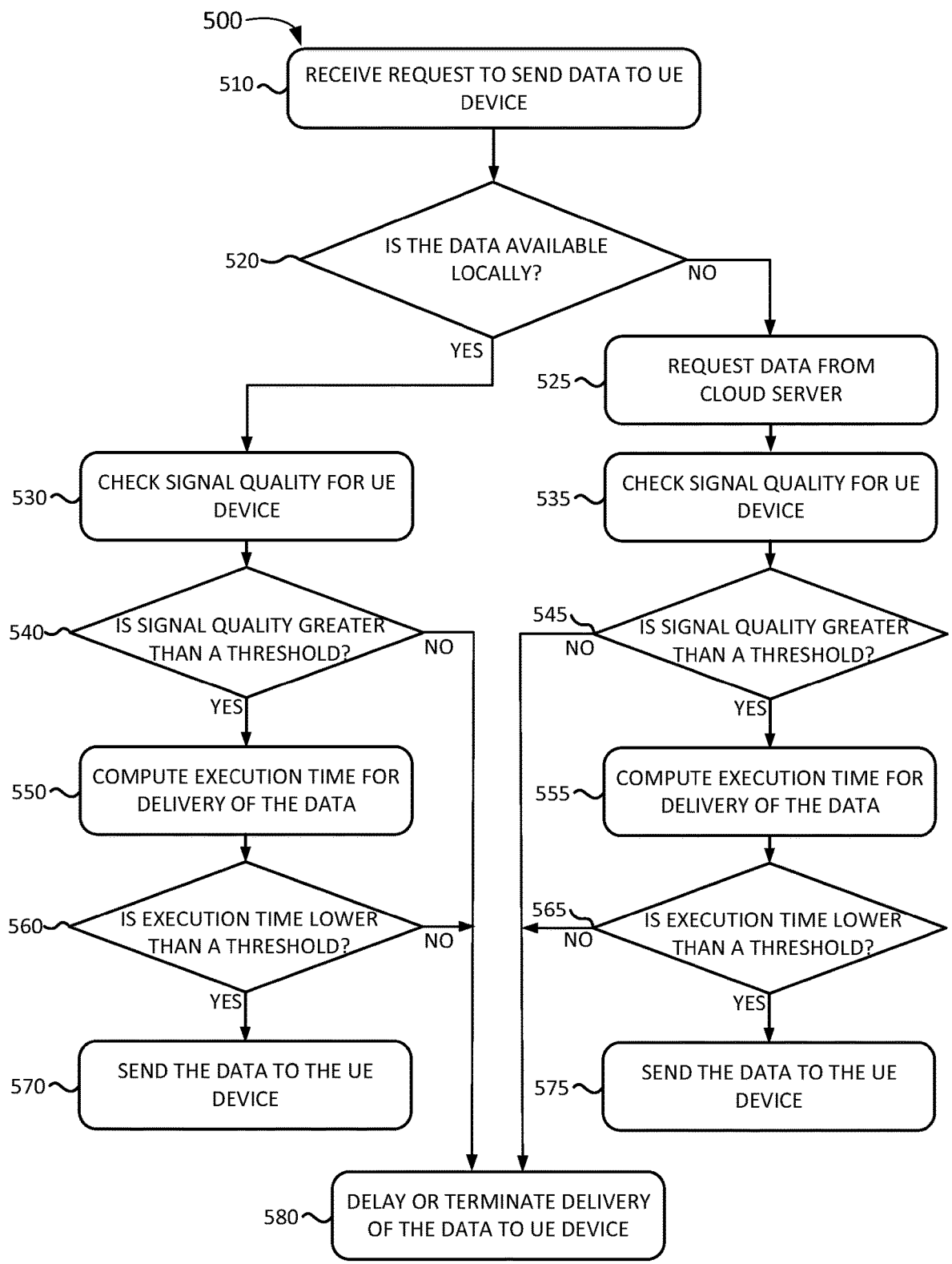
FIG. 5 is a flowchart for providing data from an edge node to a user equipment device using unicast according to an implementation described herein.

FIG. 5 illustrates a process 500 for unicast data delivery according to an implementation described herein. In some implementations, process 500 of FIG. 5 may be performed by edge node 210. In other implementations, some or all of process 500 may be performed by another device or a group of devices separate from edge node 210.

As shown in FIG. 5, process 500 may include receiving a request to send data to a UE device (block 510). As an example, edge node 210 may receive a request for a particular data item from UE device 110, such as a request to stream a video or audio file, a request for content for an online game, a request for an update for an application installed on UE device 110, and/or another type of request. As another example, edge node 210 and/or cloud server 165 may push an update or notification to a particular application installed on UE device 110. As yet another example, UE device 110 may be subscribed for notifications associated with an application installed on UE device 110. Edge node 210 may check to determine whether the requested data is available locally by, for example, checking a local storage using content/data interface 440.

Edge node 210 may respond to UE device 110 with an acknowledgement and UE device 110 may, in response, request to establish a data connection with edge node 210. Edge node 210 may respond with a connection establishment acknowledgement to complete the connection. Furthermore, edge node 210 may determine whether the requested data is to be sent via unicast, multicast, or broadcast. For example, edge node 210 may determine how many other UE devices 110 have requested the particular data item within a particular time period, during which the request from UE device 110 has been received. If multiple UE devices 110 have requested the particular data item within the particular time period, edge node 210 may select to send the particular data item to the multiple UE devices 110 via multicast. Additionally, or alternatively, a particular data item may be designated for multicast or broadcast. For example, the particular data item may be labeled with a multicast group ID and may be sent via multicast to UE devices 110 associated with the multicast group ID. As another example, the particular data item may be designated for broadcast and may sent to all UE devices 110 being serviced by edge node 210.

If the data to be sent is available locally (block 520—YES), process 500 may continue to check the signal quality for UE device 110 (block 530). For example, edge node 210 may access the most recent measurement report received from UE device 110 to determine a signal quality value, such as an RSSI value, an RSRP value, an RSRQ value, an SNR value, an SINR value, and/or another type of signal quality value.

A determination may be made as to whether the signal quality is greater than a signal quality threshold (block 540). For example, edge node 210 may store one or more signal quality minimum (min) values, such as an $RSSI_{min}$, $RSRP_{min}$, $RSRQ_{min}$, $SNR_{min}$, $SINR_{min}$, and/or another type of threshold, and may determine whether $RSSI > RSSI_{min}$, $RSRP > RSRP_{min}$, $RSRQ > RSRQ_{min}$, $SNR > SNR_{min}$, and/or $SINR > SINR_{min}$ for the signal quality value for UE device 110. If the signal quality is not greater than the signal quality threshold (block 540—NO), delivery of the data to UE device 110 may be delayed or terminated (block 580). As an example, edge node 210 may delay the delivery of the requested data for a particular length of time and may recheck the signal quality of UE device 110 after the particular length of time has elapsed. As another example, edge node 210 may terminate delivery of the requested data to UE device 110 and/or may send an indication to UE device 110 that delivery of the requested data has failed.

If the signal quality is greater than the signal quality threshold (block 540—YES), process 500 may compute the execution time for delivery of the data (block 550). For unicast delivery, the total execution time $T_{TOTAL}$ for delivery, also referred to as the total latency, may correspond to the execution time $T_{EC}$ to deliver the requested data to UE device. In other words, for unicast, $T_{TOTAL} = T_{EC}$. In order to estimate $T_{EC}$, edge node 210 may first estimate the radio channel capacity of the wireless access link between UE device 110 and base station 120 associated with edge node 210.

Signal quality monitor 470 of edge node 210 may include a machine learning model to estimate the radio channel capacity $C_{EC}$ in real-time based on the base station bandwidth W, the received average signal power P, the average noise power N, and the number of antennas M (e.g., single-input single-output (SISO) antennas, single-input multiple-output (SIMO) antennas, multiple-input single-output (MISO) antennas, and/or multiple-input multiple-output (MIMO) antennas). Additionally, or alternatively, signal quality monitor 470 of edge node 210 may approximate the radio channel capacity $C_{EC}$ based on the Shannon-Hartley Theorem using the following set of equations:

$$C_{EC} = \begin{cases} W*\log_2(1+SNR), \text{ for } SISO \\ W*\log_2(1+M*SNR), \text{ for } SIMO/MISO, \\ M*W*\log_2(1+SNR), \text{ for } MIMO \end{cases}$$

where SNR=P/N, with P corresponding to the signal power and N corresponding to the noise power.

The throughput $TH_{EC}$ for a particular UE device 110 may be determined based on $$TH_{EC} = \frac{C_{EC}}{n},$$

where n corresponds to the number of all UE devices 110 being serviced by base station 120. The execution time $T_{EC}$ may be determined based on $$T_{EC} = \frac{L}{TH_{EC}},$$

where L corresponds to the size of the data to be delivered.

A determination may be made as to whether the execution time is lower than a threshold (block 560). For example, edge node 210 may determine a maximum allowable execution time $T_{MAX}$ as the threshold, based on a QoS requirement associated with UE device 110 and/or the data to be sent to UE device 110. The QoS requirement may be based on, for example, a latency requirement for an application that is to receive the data to be sent to UE device 110. If it is determined that the execution time is lower than the threshold (block 560—YES), the data may be sent to UE device 110 (block 570). Thus, if $T_{EC}<T_{MAX}$, edge node 210 may send the data to UE device 110 via base station 120. If it is determined that the execution time is not lower than the threshold (block 560—NO), delivery of the data to UE device 110 may be delayed or terminated (block 580), as explained above.

Returning to block 520, if the data to be sent to UE device is not available locally (block 520—NO), process 500 may continue to request the data from a central cloud server (block 525). For example, edge node 210 may send a request to cloud server 165 to obtain the data to be sent to UE device 110, such as a video or audio file, content for an online game, an update or notification for an application installed on UE device 110, and/or another type of data item. Cloud server 165 and/or edge node 210 may estimate the execution time $T_{CS}$ to deliver the requested data from cloud server 165 to edge node 210. As an example, $T_{CS}$ may be determined based on a historical latency of data sent from cloud server 165 to edge node 210 for data items of comparable size. As another example, edge node 210 may estimate $T_{CS}$ based on an average latency between cloud server 165 and edge node 210 and the size of the requested data item.

A determination may be made as to whether the signal quality is greater than a signal quality threshold (block 545). For example, edge node 210 may store one or more signal quality minimum (min) values, such as an $RSSI_{min}$, $RSRP_{min}$, $RSRQ_{min}$, $SNR_{min}$, $SINR_{min}$, and/or another type of threshold, and may determine whether $RSSI>RSSI_{min}$, $RSRP>RSRP_{min}$, $RSRQ>RSRQ_{min}$, $SNR>SNR_{min}$, and/or $SINR>SINR_{min}$ for the signal quality value for UE device 110. If the signal quality is not greater than the signal quality threshold (block 545—NO), delivery of the data to UE device 110 may be delayed or terminated (block 580).

If the signal quality is greater than the signal quality threshold (block 545—YES), process 500 may compute the execution time for delivery of the data (block 555). The total execution time $T_{TOTAL}$ for delivery, when the data item is obtained from cloud server 165, may correspond to the execution time $T_{CS}$ to obtain the data item from central server 165 plus the execution time $T_{EC}$ to deliver the data item to UE device. Thus, when the data item is obtained from cloud server 165, $T_{TOTAL}=T_{CS}+T_{EC}$. $T_{EC}$ may be determined as described above with respect to block 550.

A determination may be made as to whether the execution time is lower than a threshold (block 565). For example, edge node 210 may determine a maximum allowable execution time $T_{MAX}$ as the threshold, based on a QoS requirement associated with UE device 110 and/or the data to be sent to UE device 110. If it is determined that the execution time is lower than the threshold (block 565—YES), the data may be sent to UE device 110 (block 575). Thus, if $T_{TOTAL}<T_{MAX}$, edge node 210 may send the data to UE device 110 via base station 120. If it is determined that the execution time is not lower than the threshold (block 565—NO), delivery of the data to UE device 110 may be delayed or terminated (block 580), as explained above.

Figure 6:
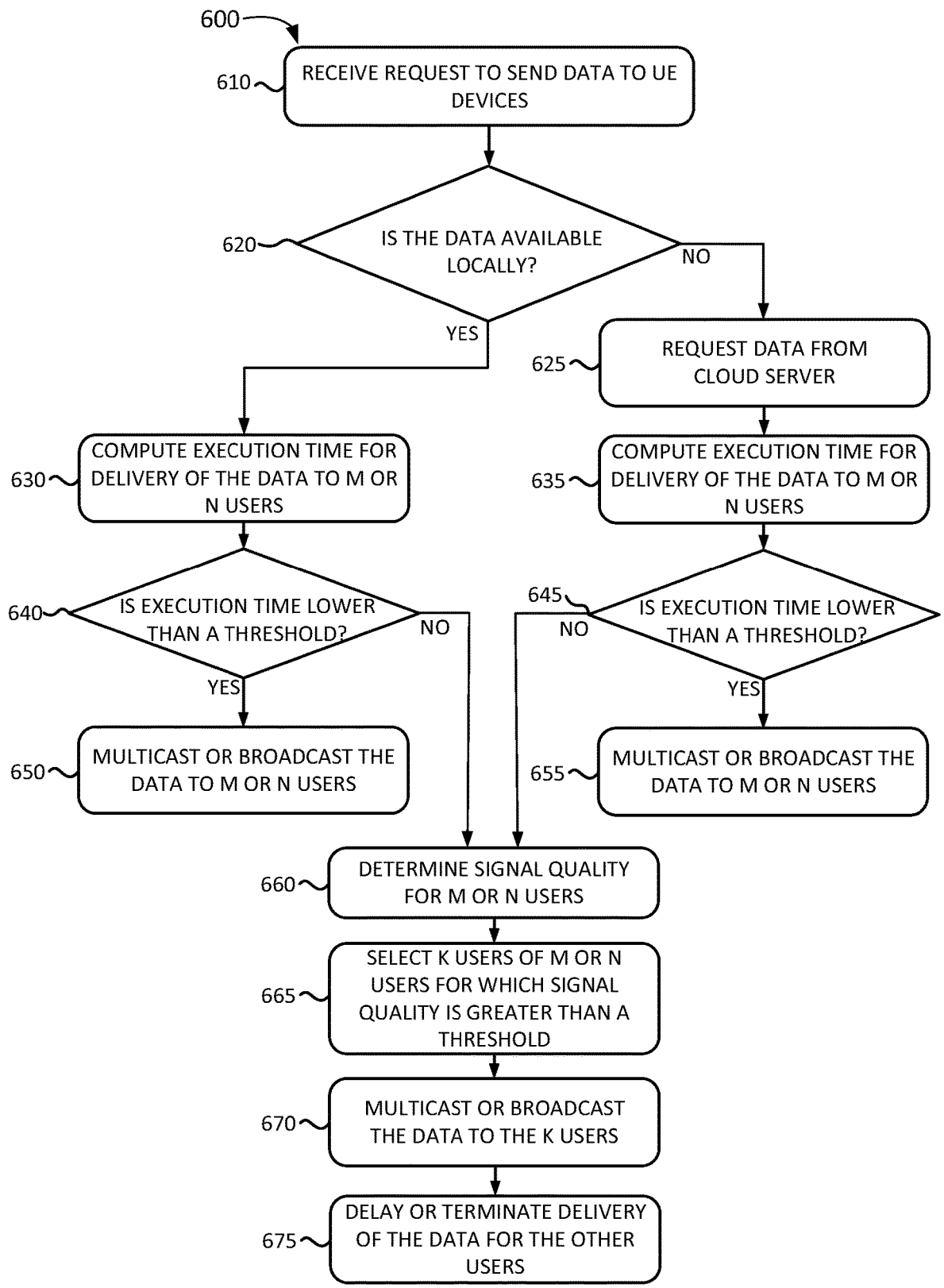
FIG. 6 is a flowchart for providing data from an edge node to a user equipment device using multicast or broadcast according to an implementation described herein.

FIG. 6 illustrates a process 600 for multicast or broadcast data delivery according to an implementation described herein. In some implementations, process 600 of FIG. 6 may be performed by edge node 210. In other implementations, some or all of process 600 may be performed by another device or a group of devices separate from edge node 210.

As shown in FIG. 6, process 600 may include receiving a request to send data to UE devices (block 610). As an example, edge node 210 may receive a request for a particular data item from a set of UE devices 110 within a particular time period, such as a request to stream a video or audio file, a request for content for an online game, a request for an update for an application installed on UE devices 110, and/or another type of request. As another example, edge node 210 and/or cloud server 165 may push an update or notification to a particular application installed on UE devices 110. As yet another example, UE devices 110 may be subscribed to notifications associated with an application installed on UE devices 110. Edge node 210 may check to determine whether the requested data is available locally by, for example, checking a local storage via content/data interface 440.

Edge node 210 may determine that the data is to be sent via multicast or broadcast. For example, if n users are being serviced by base station 120, edge node 210 may determine that m users, where m<n, have requested the particular data item within a particular time period. Additionally, or alternatively, a particular data item may be designated for multicast or broadcast. For example, the particular data item may be labeled with a multicast group ID and may be sent via multicast to UE devices 110 associated with the multicast group ID. As another example, the particular data item may be designated for broadcast and may sent to all n UE devices 110 being serviced by base station 120.

If the data to be sent is available locally (block 620—YES), process 600 may continue to compute the execution time for delivery of the data to m or n users in the multicast or broadcast group (block 630). For multicast delivery, the total execution time $T_{TOTAL}$ for delivery may correspond to the execution time $T_{EC}$ to deliver the requested data to UE devices 110. In order to estimate $T_{EC}$, edge node 210 may first estimate the radio channel capacity CEC of the wireless access link between UE devices 110 and base station 120 associated with edge node 210 based on:

$$T_{EC} = \frac{m*L}{C_{EC}},$$

where m is the number of users in the multicast group and L is the size of the data item to be sent via multicast to the m users. Similarly, for broadcast delivery, the total execution time $T_{TOTAL}$ for delivery may correspond to the execution time $T_{EC}$ to deliver the requested data to UE devices 110:

$$T_{EC} = \frac{n*L}{C_{EC}},$$

where n is the number of all users in the broadcast group, and L is the size of the data item to be sent via broadcast to the n users.

A determination may be made as to whether the execution time is lower than a threshold (block 640). For example, edge node 210 may determine a maximum allowable execution time $T_{MAX}$ as the threshold, based on a QoS requirement associated with UE devices 110 and/or the data to be sent to UE devices 110. The QoS requirement may be based on, for example, a latency requirement for an application that is to receive the data to be sent to UE devices 110. If it is determined that the execution time is lower than the threshold (block 640—YES), the data may be multicast to the m UE devices 110 (or broadcast to all n users serviced by base station 120 for a broadcast transmission) (block 650). Thus, if $T_{EC}<T_{MAX}$, edge node 210 may send the data to the m UE devices 110 via base station 120 (or to all n users serviced by base station 120 for a broadcast transmission).

If it is determined that the execution time is not lower than the threshold (block 640—NO), processing may continue to determine the signal quality for the users (block 660). For example, edge node 210 may check the signal quality for m users (for a multicast transmission with m users in the multicast group) or for all n users (for a broadcast transmission with all n users serviced by base station 120). For example, edge node 210 may access the most recent measurement reports received from UE devices 110 to determine a signal quality value, such as an SNR value, an SINR value, an RSSI value, an RSRP value, an RSRQ value, and/or another type of signal quality value, for each UE device 110.

Process 600 may further include selecting k users from the m users for which a signal quality is greater than a threshold (block 665). Since the execution time $T_{EC}$ depends on the number of users m, edge node 210 may rank the multicast users based on the signal quality associated with each UE device 110 and select k users, with k<m, for which the signal quality is greater than a threshold. For example, edge node 210 may store one or more signal quality minimum (min) values, such as $SNR_{min}$, $SINR_{min}$, $RSSI_{min}$, $RSRP_{min}$, $RSRQ_{min}$, and/or another type of threshold, and may determine whether $SNR>SNR_{min}$, $SINR>SINR_{min}$, $RSSI>RSSI_{min}$, $RSRP>RSRP_{min}$, $RSRQ>RSRQ_{min}$, etc. for the signal quality value for each UE device 110 in the m users (or the n users serviced by base station 120 for a broadcast transmission). For example, edge node 210 may determine $$SNR_i = \frac{P_i}{N_i} > SNR_{min},$$

where i=1, 3, . . . m and $SNR_{min}$ is the SNR threshold.

The data may be multicast to the selected k users (block 670) and delivery of the data may be delayed or terminated for the other users (block 675). Edge node 210 may send the data item to the selected k UE devices 1110. Furthermore, as an example, edge node 210 may delay the delivery of the requested data for a particular length of time for the remaining m-k UE devices 110 in the multicast group for a multicast transmission or for the remaining n-k UE devices 110 serviced by base station 120 for a broadcast transmission. As another example, edge node 210 may terminate delivery of the requested data to the remaining m-k UE devices 110 for a multicast transmission, or to the remaining n-k UE devices 110 for a broadcast transmission, and/or may send an indication to m-k (or n-k) UE devices 110 that delivery of the requested data has failed.

Returning to block 620, if the data to be sent to UE device is not available locally (block 620—NO), process 600 may continue to request the data from a central cloud server (block 625). For example, edge node 210 may send a request to cloud server 165 to obtain the data to be sent to UE device 110, such as a video or audio file, content for an online game, an update or notification for an application installed on UE device 110, and/or another type of data item. Cloud server 165 and/or edge node 210 may estimate the execution time $T_{CS}$ to deliver the requested data from cloud server 165 to edge node 210. As an example, $T_{CS}$ may be determined based on a historical latency of data sent from cloud server 165 to edge node 210 for data items of comparable size. As another example, edge node 210 may estimate $T_{CS}$ based on an average latency between cloud server 165 and edge node 210 and the size of the requested data item.

Process 600 may continue to compute the execution time for delivery of the data to m or n users in the multicast or broadcast group (block 635). The total execution time $T_{TOTAL}$ for delivery, when the data item is obtained from cloud server 165, may correspond to the execution time $T_{CS}$ to obtain the data item from central server 165 plus the execution time $T_{EC}$ to deliver the data item to UE devices 110. Thus, when the data item is obtained from cloud server 165, $T_{TOTAL}=T_{CS}+T_{EC}$. $T_{EC}$ may be determined as described above with respect to block 630.

A determination may be made as to whether the execution time is lower than a threshold (block 645). For example, edge node 210 may determine a maximum allowable execution time $T_{MAX}$ as the threshold, based on a QoS requirement associated with UE devices 110 and/or the data to be sent to UE devices 110. If it is determined that the execution time is lower than the threshold (block 645—YES), the data may be multicast to the m UE devices 110 (or broadcast to all n users serviced by base station 120 for a broadcast transmission) (block 655). Thus, if $T_{EC}<T_{MAX}$, edge node 210 may send the data to them UE devices 110 via base station 120

(or to all n users serviced by base station 120 for a broadcast transmission). If it is determined that the execution time is not lower than the threshold (block 640—NO), processing may continue to determine the signal quality for the users (block 660) as described above.

Figure 7:
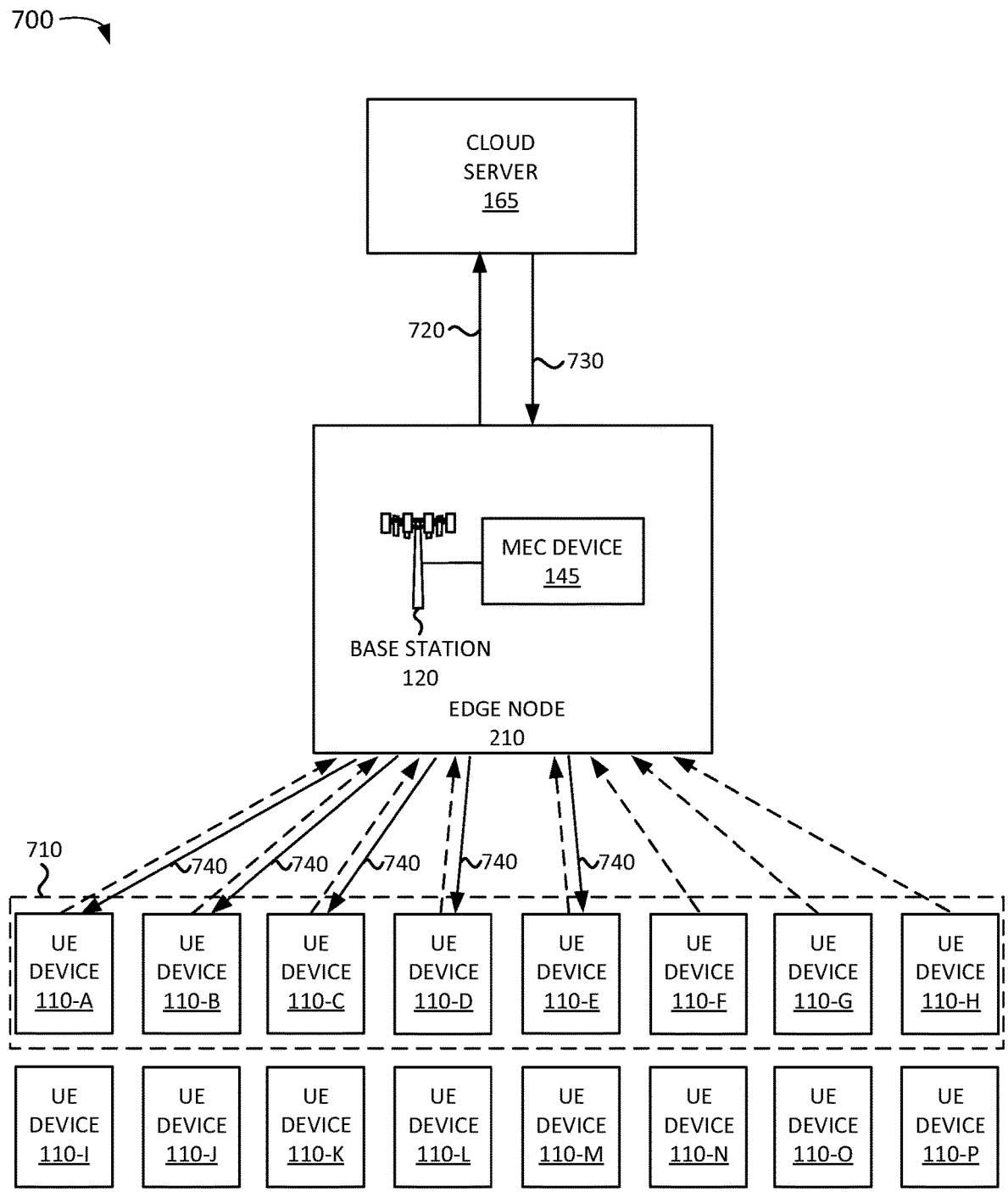
FIG. 7 is a diagram illustrating an exemplary signal flow according to an implementation described herein.

FIG. 7 is a diagram illustrating an exemplary signal flow 700 according to an implementation described herein. As shown in FIG. 7, signal flow 700 may include UE devices 110-A, 110-B, 110-C, 110-D, 110-E, 110-F, 110-G, 110-H, 110-I, 110-J, 110-K, 110-L, 110-M, 110-N, 110-O, and 110-P attached to base station 120 of edge node 210. UE devices 110-A, 110-B, 110-C, 110-D, 110-E, 110-F, 110-G, and 110-H may all request, for example, to stream a particular video file within a time period (e.g., a within the one second time period, etc.) and may thus be placed into a multicast group 710 by base station 120.

Base station 120 may forward the requests for the particular video file to MEC device 145. MEC device 145 may determine that the requested video file is available locally and may compute the execution time to deliver the requested video files to UE devices 110-A to 110-H. MEC device 145 may also determine that the requested video file is not available locally and request the video file from cloud server 165 (signal 720). Cloud server 165 may respond by providing the requested video file to MEC device 145 (signal 730). While obtaining the video file from cloud server 165, MEC device 145 may compute the execution time to deliver the requested video files to UE devices 110-A to 110-H. The execution time may be computed as the execution time to deliver the video file to UE devices 110 from MEC device 145 if the video file is available locally, or as the sum of the of the execution time to obtain the video file from cloud server 165 and the execution time to deliver the video file to UE devices 110 from MEC device 145 if the video file is not available locally as explained above with reference to FIG. 6.

MEC device 145 may determine whether the computed execution time is less than an execution time threshold. The execution time threshold may be based on, for example, a latency requirement for video streaming. If the computed execution time is greater that the execution time threshold, MEC device 145 may determine that the video file cannot be streamed to all UE devices 110 that requested the file at the same time. Therefore, MEC device 145 may compute an SNR value for UE devices 110-A, 110-B, 110-C, 110-D, 110-E, 110-F, 110-G, and 110-H in the multicast group and select UE devices 110-A, 110-B, 110-C, 110-D, and 110-E based on the SNR values for UE devices 110-A, 110-B, 110-C, 110-D, and 110-E being higher than an SNR threshold. MEC device 145 (signals 740) may then stream the requested video file to UE devices 110-A, 110-B, 110-C, 110-D, and 110-E and may delay streaming the requested video file to UE devices 110-F, 110-G, and 110-H. For example, MEC device 145 may schedule to stream the requested video file to UE devices 110-F, 110-G, and 110-H during a next transmission period by base station 120.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 5 and 6, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

receiving, by a device, a request to send data to a plurality of user equipment (UE) devices, wherein the device includes a Multi-Access Edge Computing (MEC) device associated with a base station;
determining, by the device, that the data is to be delivered to the plurality of UE devices by the base station via multicast;
computing, by the device, an execution time to deliver the data to the plurality of UE devices;
determining, by the device, that the computed execution time is greater than an execution time threshold;
determining, by the device, signal quality values for the plurality of UE devices;
selecting, by the device, a subset of the plurality of UE devices based on the determined signal quality values; and
sending, by the device and using the base station, the data to the selected subset of the plurality of UE devices via multicast, and delaying or terminating delivery of the requested data to UE devices, of the plurality of UE devices, that are not in the selected subset, based on determining that the computed execution time is greater than the execution time threshold.

2. The method of claim 1, wherein the execution time is computed based on a ratio of a size of the data and a throughput associated with the base station.

3. The method of claim 2, further comprising:
determining that the data is not available locally in a storage location associated with the MEC device;
obtaining the data from a cloud server via a core network associated with the base station, in response to determining that the data is not available locally in the storage location associated with the MEC device; and
wherein the execution time is further computed based on a time to obtain the data from the cloud server.

4. The method of claim 2, wherein the throughput associated with the base station is based on a radio channel capacity associated with the base station and a number of UE devices serviced by the base station.

5. The method of claim 2, wherein the throughput associated with the base station is based on a bandwidth associated with the base station and a signal to noise ratio associated with the base station.

6. The method of claim 2, wherein the throughput associated with the base station is based on an antenna type associated with the base station.

7. The method of claim 1, further comprising:
determining that the data is not available locally in a storage location associated with the MEC device; and
obtaining the data from a cloud server via a core network associated with the base station, in response to determining that the data is not available locally in the storage location associated with the MEC device.

8. The method of claim 1, further comprising:
receiving a request to send other data to the plurality of UE devices via multicast;
computing an execution time to deliver the other data to the plurality of UE devices;
determining that the computed execution time is less than an execution time threshold; and
sending the other data to the plurality of UE devices via multicast, in response to determining that the computed execution time is less than the execution time threshold.

9. The method of claim 1, further comprising:
receiving a request to send other data to a UE device via unicast;
obtaining a signal quality value for the UE device;
determining that the obtained signal quality value is less than a signal quality value threshold; and
delaying or terminating delivery of the other data to the UE device, in response to determining that the obtained signal quality value is less than the signal quality value threshold.

10. The method of claim 1, wherein the signal quality values include at least one of:
a Reference Signal Received Power (RSRP) value,
a Receive Strength Signal Indicator (RSSI) value,
a Reference Signal Received Quality (RSRQ) value,
a Signal to Noise Ratio (SNR) value, or
a Signal to Interference Plus Noise Ratio (SINR) value.

11. A device comprising:
a processor configured to:
receive a request to send data to a plurality of user equipment (UE) devices, wherein the device includes a Multi-Access Edge Computing (MEC) device associated with a base station;
determine that the data is to be delivered to the plurality of UE devices by the base station via multicast;
compute an execution time to deliver the data to the plurality of UE devices;
determine that the computed execution time is greater than an execution time threshold;
determine signal quality values for the plurality of UE devices;
select a subset of the plurality of UE devices based on the determined signal quality values; and
send, using the base station, the data to the selected subset of the plurality of UE devices via multicast, and delaying or terminating delivery of the requested data to UE devices, of the plurality of UE devices, that are not in the selected subset, based on determining that the computed execution time is greater than the execution time threshold.

12. The device of claim 11, wherein the execution time is computed based on a ratio of a size of the data and a throughput associated with the base station.

13. The device of claim 12, wherein the throughput associated with the base station is based on a radio channel capacity associated with the base station and a number of UE devices serviced by the base station.

14. The device of claim 13, wherein the radio channel capacity associated with the base station is based on at least one of:
a bandwidth associated with the base station,
a signal to noise ratio associated with the base station, or
an antenna type associated with the base station.

15. The device of claim 11, wherein the processor is further configured to:
determine that the data is not available locally in a storage location associated with the MEC device; and
obtain the data from a cloud server via a core network associated with the base station, in response to determining that the data is not available locally in the storage location associated with the MEC device.

16. The device of claim 11, wherein the processor is further configured to:
receive a request to send other data to the plurality of UE devices via multicast;
compute an execution time to deliver the other data to the plurality of UE devices;
determine that the computed execution time is less than an execution time threshold; and send the other data to the plurality of UE devices via multicast, in response to determining that the computed execution time is less than the execution time threshold.

17. The device of claim 11, wherein the signal quality value includes at least one of:
   a Reference Signal Received Power (RSRP) value,
   a Receive Strength Signal Indicator (RSSI) value,
   a Reference Signal Received Quality (RSRQ) value,
   a Signal to Noise Ratio (SNR) value, or
   a Signal to Interference Plus Noise Ratio (SINR) value.

18. A system comprising:
   a base station configured to:
      provide wireless communication to a plurality of user equipment (UE) devices; an
   a Multi-Access Edge Computing (MEC) device, associated with the base station, configured to:
      receive a request to send data to the plurality of UE devices;
      determine that the data is to be delivered to the plurality of UE devices by the base station via multicast;
      compute an execution time to deliver the data to the plurality of UE devices;
      determine that the computed execution time is greater than an execution time threshold;
      determine signal quality values for the plurality of UE devices;
      select a subset of the plurality of UE devices based on the determined signal quality values; and
      send, using the base station, the data to the selected subset of the plurality of UE devices via multicast, and delaying or terminating delivery of the requested data to UE devices, of the plurality of UE devices, that are not in the selected subset, based on determining that the computed execution time is greater than the execution time threshold.

19. The system of claim 18, wherein the execution time is computed based on a ratio of a size of the data and a throughput associated with the base station.

20. The system of claim 19, wherein the throughput associated with the base station is based on a radio channel capacity associated with the base station and a number of UE devices serviced by the base station.

* * * * *